US005634596A

United States Patent [19]

[11] Patent Number: 5,634,596

[45] Date of Patent: Jun. 3, 1997

Abiko

[54] FUEL INVASION PREVENTER FOR SOLENOID FUEL INJECTION VALVE

[75] Inventor: Yoshinori Abiko, Yorii-machi, Japan

[73] Assignee: Zexel Corporation, Japan

[21] Appl. No.: 455,186

[22] Filed: May 31, 1995

[30] Foreign Application Priority Data

| | | | |
|---|---|---|---|
| Jun. 1, 1994 | [JP] | Japan | 6-140714 |
| Mar. 22, 1995 | [JP] | Japan | 7-087665 |

[51] Int. Cl.$^6$ ..... F16K 31/06; F02M 51/06

[52] U.S. Cl. ..... 239/585.5

[58] Field of Search ..... 239/585.1–585.5, 239/600; 251/129.21

[56] References Cited

U.S. PATENT DOCUMENTS

| | | | |
|---|---|---|---|
| 3,521,851 | 7/1970 | Sorrow | 251/129.21 X |
| 4,395,988 | 8/1983 | Knapp et al. | 239/585.3 X |
| 4,915,350 | 4/1990 | Babitzka | 251/179.21 X |
| 5,190,221 | 3/1993 | Reiter | 239/585.1 |
| 5,232,167 | 8/1993 | McCormick et al. | 239/585.1 X |
| 5,238,224 | 8/1993 | Horsting | 239/585.3 X |
| 5,301,874 | 4/1994 | Vogt et al. | 239/585.1 X |

FOREIGN PATENT DOCUMENTS

| | | |
|---|---|---|
| 3444925 | 6/1986 | Germany . |
| 3716994 | 12/1988 | Germany . |
| 3825135 | 1/1990 | Germany . |
| 4013832 | 10/1991 | Germany . |
| 4237405 | 6/1993 | Germany . |
| 4107476 | 1/1992 | Japan . |
| 542667 | 7/1993 | Japan . |
| 1598296 | 9/1981 | United Kingdom . |

OTHER PUBLICATIONS

Patent Abstracts of Japan; M–307 Jul. 7, 1984 vol. 8/No. 146; JP 59–43959(A).

German Patent Office Action dated Aug. 16, 1996.

*Primary Examiner*—Kevin Weldon

*Attorney, Agent, or Firm*—Ostrolenk, Faber, Gerb & Soffen, LLP

[57] ABSTRACT

A fuel invasion preventer 31 for a solenoid fuel injection valve includes an anti-invasion cover 37 made of a non-magnetic material and installed in an anti-invasion space 36 defined by the bobbin 9 of the solenoid actuator 8, the fuel supply pipe 4 and the valve housing 32, and the edges 37A, 37B of the anti-invasion cover 37 on the side communicating with the fuel passage 15 are welded to the walls 42, 43 of the fuel supply pipe 4 and the valve housing 32.

20 Claims, 5 Drawing Sheets

FUEL INVASION PREVENTER FOR SOLENOID FUEL INJECTION VALVE

BACKGROUND OF THE INVENTION

1. Field of the Invention

This invention relates to a fuel invasion preventer for a solenoid fuel injection valve and, more particularly, to a fuel invasion preventer for preventing fuel from invading the solenoid actuator of a solenoid fuel injection valve.

2. Prior Art

A general explanation of the prior art low-pressure solenoid fuel injection valve as exemplified by a low pressure nozzle for gasoline engines will be given with respect to FIG. 6.

FIG. 6 is a vertical sectional view of a solenoid fuel injection valve 1 having a valve housing 2, a connector 3, a fuel supply pipe 4 made of a magnetic material, a valve stop 5, a valve seat 6 and a nozzle cover 7.

A solenoid actuator 8 is provided between the valve housing 2 and the fuel supply pipe 4 made of magnetic material.

The solenoid actuator 8 consists of a bobbin 9 (made of a nonmagnetic material such as polyamide resin and has the fuel supply pipe 4 passing through its interior) and a solenoid winding 10 wound on the bobbin 9. The solenoid actuator 8 is energized and de-energized by a control signal input through the connector 3.

An armature 11 is positioned immediately below the fuel supply pipe 4 (as seen in FIG. 6) and a needle valve 12 integrally movable with the armature 11 is biased toward a nozzle 14 at the tip of a valve seat 6 by a valve spring 13 so as to be seated on the valve seat 6.

Fuel is supplied from the top of the fuel supply pipe 4 to a first fuel passage 15, from the first fuel passage 15 to a second fuel passage 16 inside the armature 11 and then to a third fuel passage 17 between the valve seat 6 and the needle valve 12. When the solenoid actuator 8 is excited, the armature 11 and needle valve 12 are lifted (by the amount of lift L) and fuel is injected into an air intake manifold (not shown) from the nozzle 14.

If fuel should invade the solenoid actuator 8, particularly the solenoid winding 10 thereof, the solenoid winding 10 is liable to be corroded and made inoperative by fuel additives that are amine based of have a sulfate radical.

In addition, leakage of fuel through the solenoid actuator 8 to the connector 3 must be avoided for ensuring proper performance of the solenoid fuel injection valve 1.

Invasion of fuel from a continuous space 20 communicating with the first fuel passages 15, 16 and 17 into the solenoid actuator 8, particularly the solenoid winding 10, is therefore prevented by providing a first O-ring 18 between the bobbin 9 and the outer wall of the fuel supply pipe 4 and providing a second O-ring 19 between the bobbin 9 and the inner wall of the valve housing 2.

When necessary the invasion of fuel is further contained by providing a molded gasket 21 for protecting the outer periphery of the solenoid actuator 8, as described, for example, in Japanese Utility Model Public Disclosures Hei 4-107476 and Hei 5-42667.

Generally, no pronounced fuel invasion problem arises in the solenoid fuel injection valve 1 assembled in the foregoing manner when a low injection pressure is present. However, in high-pressure solenoid fuel injection valve applications, such as for injecting fuel directly into the cylinder of a gasoline engine, the injection pressure will be higher than that which conventional, commercially available solenoid fuel injection valves can handle. Accordingly, it would not be possible to prevent fuel invasion and leakage merely by utilizing the first O-ring 18 and the second O-ring 19, with or without the molded gasket 21, so described above.

Even in a low injection pressure solenoid fuel injection valve application, there is some possibility of damage to the actuator 8 of the prior art valve from additives owing to fuel invasion or leakage. It is therefore prudent to implement measures for preventing degradation of the solenoid actuator 8 irrespective of the fuel pressure.

This invention was developed to address the foregoing problems. One object of the present invention is to provide a fuel invasion preventer for a solenoid fuel injection valve which can prevent invasion and leakage of fuel into the solenoid actuator with a simple structural arrangement.

Another object of the present invention is to provide a fuel invasion preventer for a solenoid fuel injection valve which can reliably prevent fuel invasion and leakage at increased fuel pressures.

Another object of the present invention is to provide a low-cost fuel invasion preventer for a solenoid fuel injection valve.

SUMMARY OF THE INVENTION

The invention achieves the foregoing objects by providing an anti-invasion cover welded under the solenoid winding and bobbin (from the continuous space side). More specifically, the invention provides a fuel invasion preventer for a solenoid fuel injection valve, which fuel injection valve has a valve housing, a fuel supply pipe made of a magnetic material provided in the valve housing for forming a fuel passage, a solenoid actuator which includes a bobbin through the interior of which the fuel supply pipe passes and a solenoid winding wound on the bobbin and which is installed inside the valve housing, an armature responsive to energization of the solenoid actuator, a valve seat mounted on the valve housing and formed with a fuel nozzle, and a needle valve normally seated on the valve seat and lifted therefrom for injecting fuel from the fuel nozzle when the armature lifts in response to energization of the solenoid actuator, the fuel invasion preventer comprising an anti-invasion cover made of a nonmagnetic material and installed in an anti-invasion space defined by the bobbin of the solenoid actuator, the fuel supply pipe and the valve housing, edges of the anti-invasion cover on the side communicating with the fuel passage being respectively welded to walls of the fuel supply pipe and the valve housing, whereby fuel is prevented from invading the region of the solenoid actuator.

At least one peripheral surface of the anti-invasion cover can be formed as a beveled surface making a prescribed cover bevel angle relative to a wall of the fuel supply pipe or the valve housing.

At least one peripheral surface of the anti-invasion cover can be formed as a beveled surface making a prescribed cover bevel angle relative to the direction in which the anti-invasion cover is inserted into the anti-invasion space, which cover bevel angle is made larger than a wall bevel angle of the wall of the fuel supply pipe or the valve housing.

In the fuel invasion preventer for a solenoid fuel injection valve according to this invention, the solenoid actuator is located between the fuel supply pipe and the valve housing, the anti-invasion cover made of nonmagnetic material is fitted in the anti-invasion space defined by the bobbin of the solenoid actuator, the fuel supply pipe and the valve housing where the edges of the anti-invasion cover are welded to the walls of the fuel supply pipe and the valve housing. As a result, invasion of fuel into the solenoid actuator region is reliably prevented to a degree not attainable with an invasion prevention arrangement utilizing an oil seal such as an O-ring.

Since the peripheral surfaces of the anti-invasion cover are formed as beveled surfaces having prescribed cover bevel angles, the anti-invasion cover can be easily inserted into the anti-invasion space between the walls of the fuel supply pipe and the valve housing.

In addition, since the bevel angles of the peripheral surfaces of the anti-invasion cover are made larger than the wall bevel angles at the attachment location, the anti-invasion cover can be retained at the attachment location by its own spring effect and can then be securely fixed in place by laser welding or the like. Consequently, the anti-invasion cover does not have to be fabricated with high dimensional precision and, therefore, production costs are lowered.

DETAILED DESCRIPTION OF THE PREFERRED EMBODIMENTS

Figure 1:
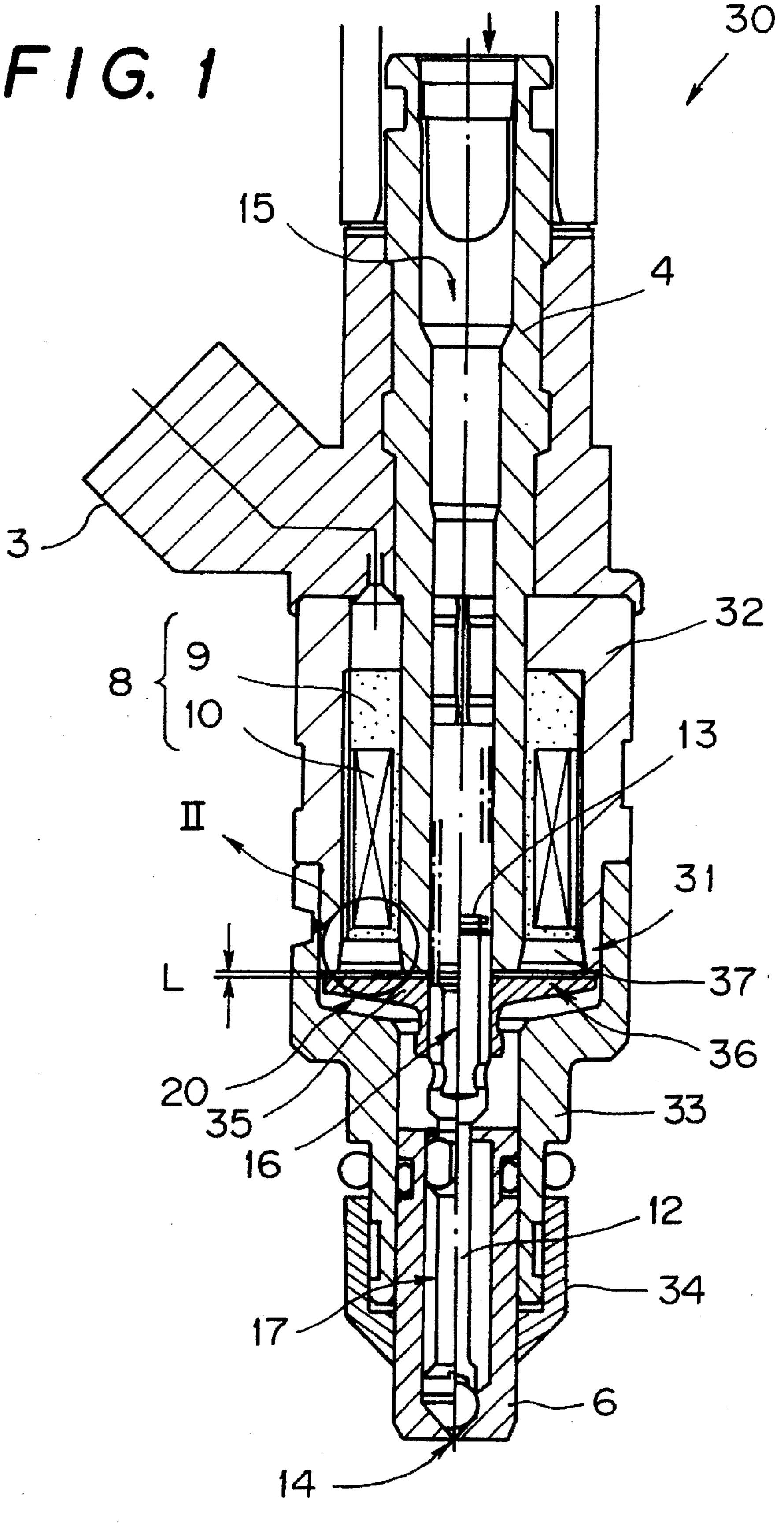
FIG. 1 is a vertical sectional view of a high-pressure solenoid fuel injection valve 30 for a direct fuel injection gasoline engine or the like, which is equipped with a first embodiment of a fuel invasion preventer of the present invention.

A high-pressure solenoid fuel injection valve 30 equipped with a fuel invasion preventer that is a first embodiment of the invention will now be explained with reference to FIGS. 1 through 3. The high-pressure solenoid fuel injection valve 30 is intended to be used, for example, for directly injecting fuel into a cylinder of a gasoline engine. Parts that are similar to those shown in FIG. 1 are assigned the same reference numerals as those in FIG. 1.

FIG. 1 is a vertical sectional view of the high-pressure solenoid fuel injection valve 30 utilizing fuel invasion preventer 31. The basic structure of the solenoid fuel injection valve 30 is substantially the same as that of the solenoid fuel injection valve 1 described earlier, although, among other differences, it has an upper valve housing 32 and a lower valve housing 33 in place of the valve housing 2 and the valve seat 6 is provided with a retaining nut 34.

Figure 6:
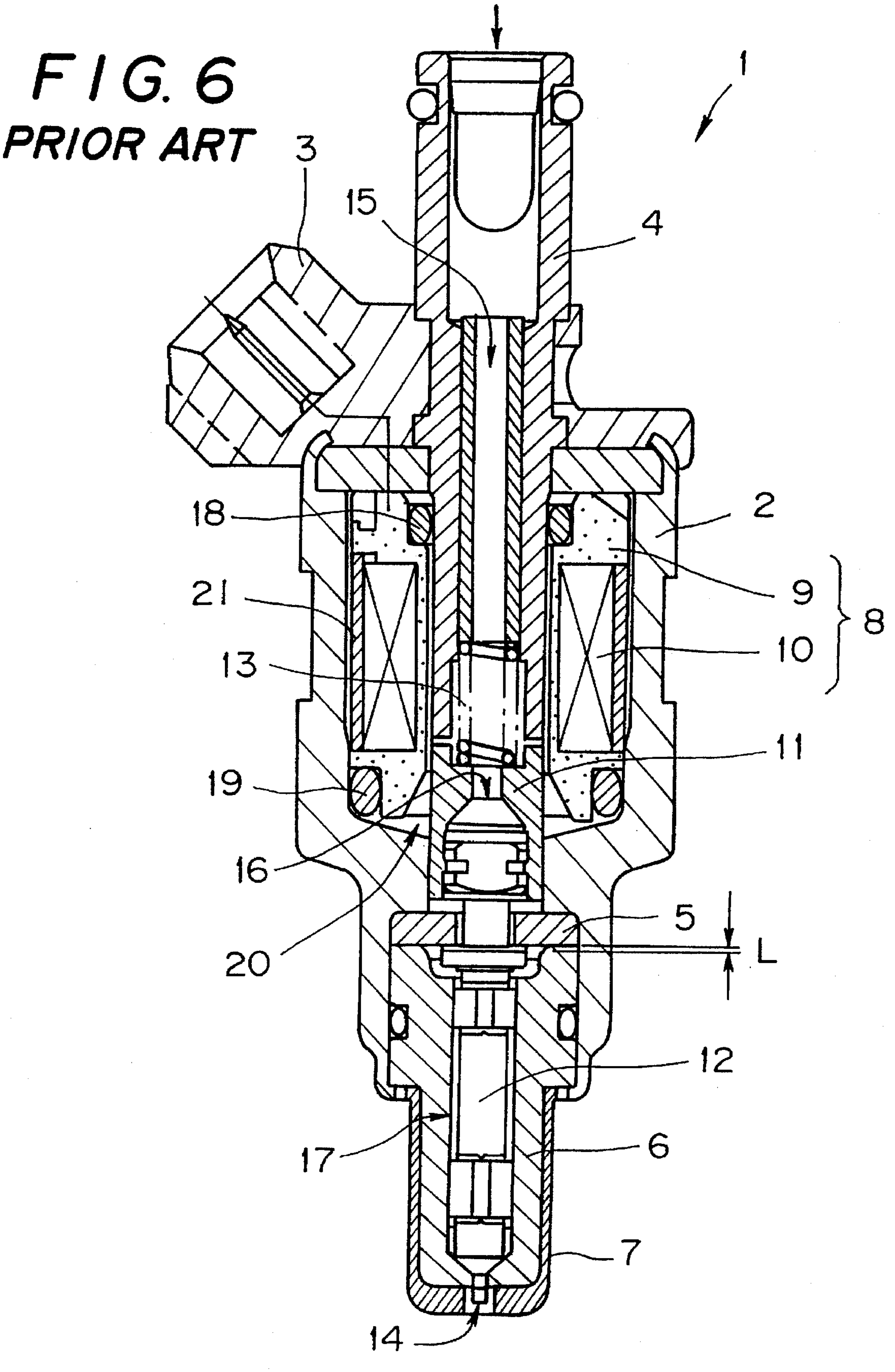
FIG. 6 PRIOR ART
FIG. 6 is a vertical sectional view of a prior art low-pressure solenoid fuel injection valve used, for example, as a low pressure nozzle for a gasoline engine.

At the fuel invasion preventer 31, an anti-invasion cover 37 is provided in an anti-invasion space 36 established between the bobbin 9 of the solenoid actuator 8 and a flat armature 35 corresponding to the armature 11 of FIG. 6.

From the viewpoint of the performance of the solenoid fuel injection valve 30, the anti-invasion cover 37 is required to cut off the magnetic path. In addition, it has to be amenable to laser welding. It is therefore preferably made of austenitic stainless steel and can be fabricated by pressing a thin sheet of such steel into the required shape.

Figure 2:
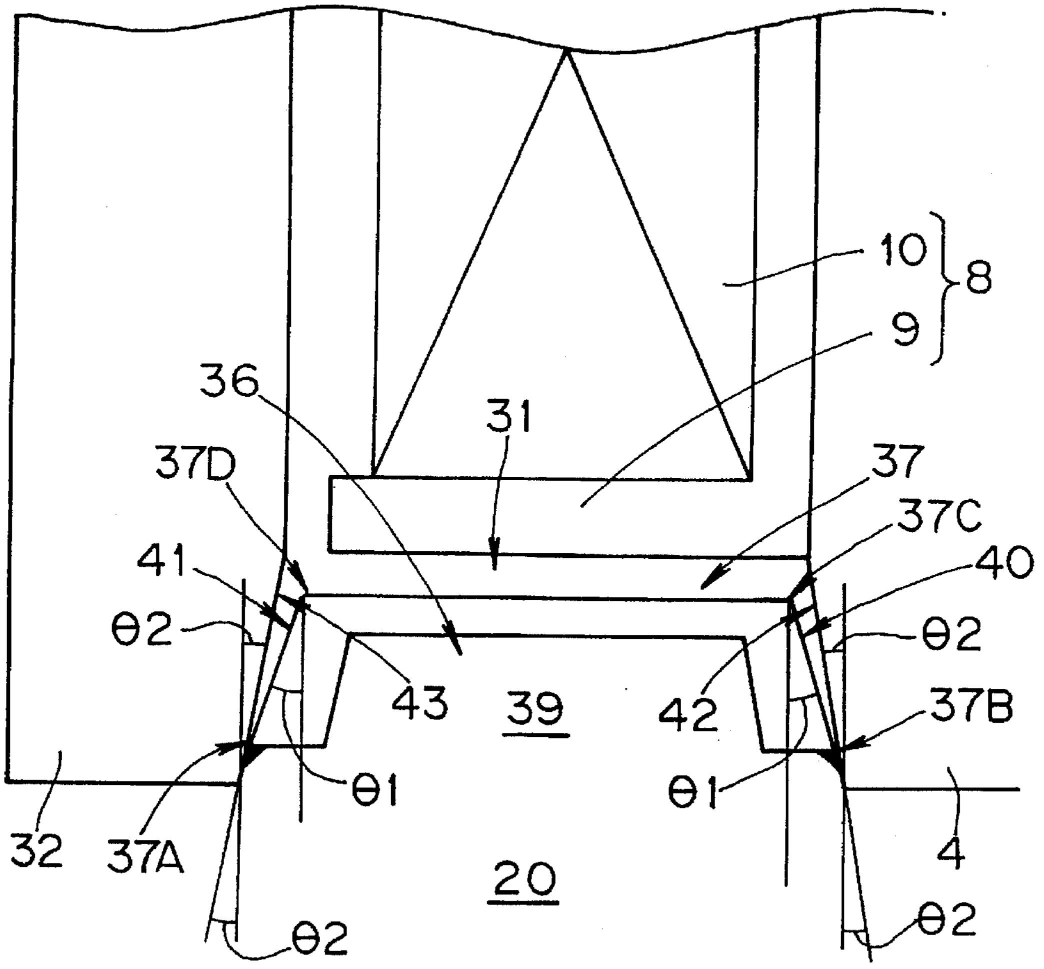
FIG. 2 is an enlarged sectional view of an anti-invasion space portion at the region labeled II in FIG. 1.
Figure 3:
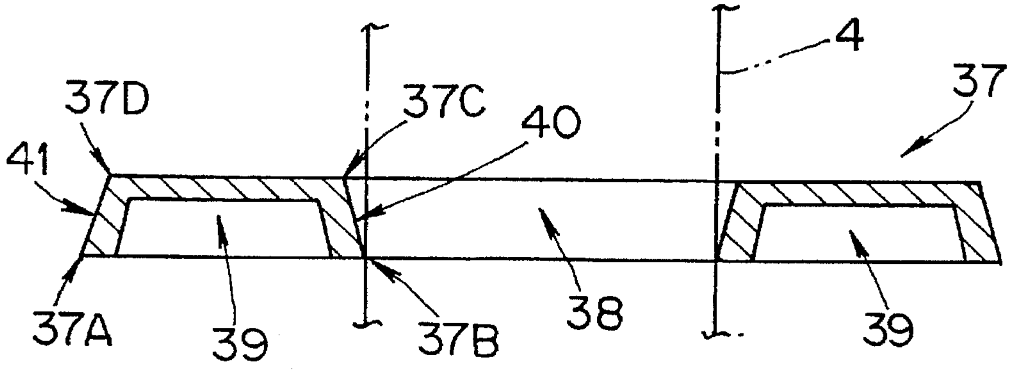
FIG. 3 is an enlarged vertical sectional view of an anti-invasion cover of the fuel invasion preventer of FIG. 1.

FIG. 2 is an enlarged sectional view of the anti-invasion space 36 at the region marked II in FIG. 1 and FIG. 3 is an enlarged vertical sectional view of the anti-invasion cover 37. As shown in FIG. 3, the anti-invasion cover 37 has the shape of a truncated cone formed with a center insertion hole 38 and is made elastic (given a spring effect) by forming it with an interior annular space 39.

The positional relationship among the edges of the anti-invasion cover 37 will be explained assuming that, as shown best in FIG. 2, the side of the solenoid actuator 8 is up and the side of the anti-invasion space 36 (or continuous space 20) and the third fuel passage 17 is down. Based on this assumption, the anti-invasion cover 37 has a lower outer edge 37A, a lower inner edge 37B, an upper inner edge 37C and an upper outer edge 37D. The positional relationship among these edges is preferably such that cover bevel angles θ1 are formed on both the inside and the outside of the cover 37 and that these angles are respectively larger than wall bevel angles θ2 at the lower end portions of the fuel supply pipe 4 and the upper valve housing 32 to which these edges are attached.

The cover bevel angle θ1 is the angle between the inner beveled surface 40 or the outer beveled surface 41 of the anti-invasion cover 37 and the direction of insertion of the anti-invasion cover 37 (the longitudinal direction of the fuel supply pipe 4 and the upper valve housing 32). Although the angles θ1 of the inner beveled surface 40 and the outer beveled surface 41 are the same in the illustrated embodiment, they may be different if desired.

The wall bevel angle θ2 is the angle between the wall 42 at the lower end portion of the fuel supply pipe 4 or the wall 43 at the lower end of the upper valve housing 32 and the direction of insertion of the anti-invasion cover 37. Although the angles θ2 of the fuel supply pipe 4 and the upper valve housing 32 are the same in the illustrated embodiment, they may be made different if desired.

In the anti-invasion space 36, the lower inner edge 37B of the anti-invasion cover 37 is laser-welded to the wall 42 at the lower end portion of the fuel supply pipe 4 and the lower outer edge 37A thereof is laser-welded to the wall 43 at the lower end portion of the upper valve housing 32. As a result, the solenoid actuator 8 and the continuous space 20 (the first fuel passages 15, 16 and 17) are isolated from each other so that fuel is prevented from invading the solenoid actuator 8.

For increasing the reliability of the laser welding, the portions to be welded have to be brought in contact with each other.

When, as described in the foregoing, the bevel angles of the surfaces of the anti-invasion cover 37, the fuel supply pipe 4 and the upper valve housing 32 satisfy the relationship: (wall bevel angles θ2)<(cover bevel angles θ1), a spring effect is obtained, particularly at the lower outer edge 37A and the lower inner edge 37B. The members are therefore able to make reliable contact even if the members are not fabricated with high dimensional precision. This, plus the fact that the laser welding can be readily conducted from the direction of the continuous space 20, ensures that the welding can be carried out with enhanced reliability.

The use of the foregoing embodiment of the anti-invasion cover 37 is thus a cost effective way of reliably preventing invasion of fuel into the solenoid actuator 8 region under high-pressure fuel conditions.

Insofar as the anti-invasion cover 37 is formed with the inner beveled surface 40 and the outer beveled surface 41, the advantages of the invention mentioned in the foregoing can be obtained even if the wall bevel angles θ2 are zero.

Figure 4:
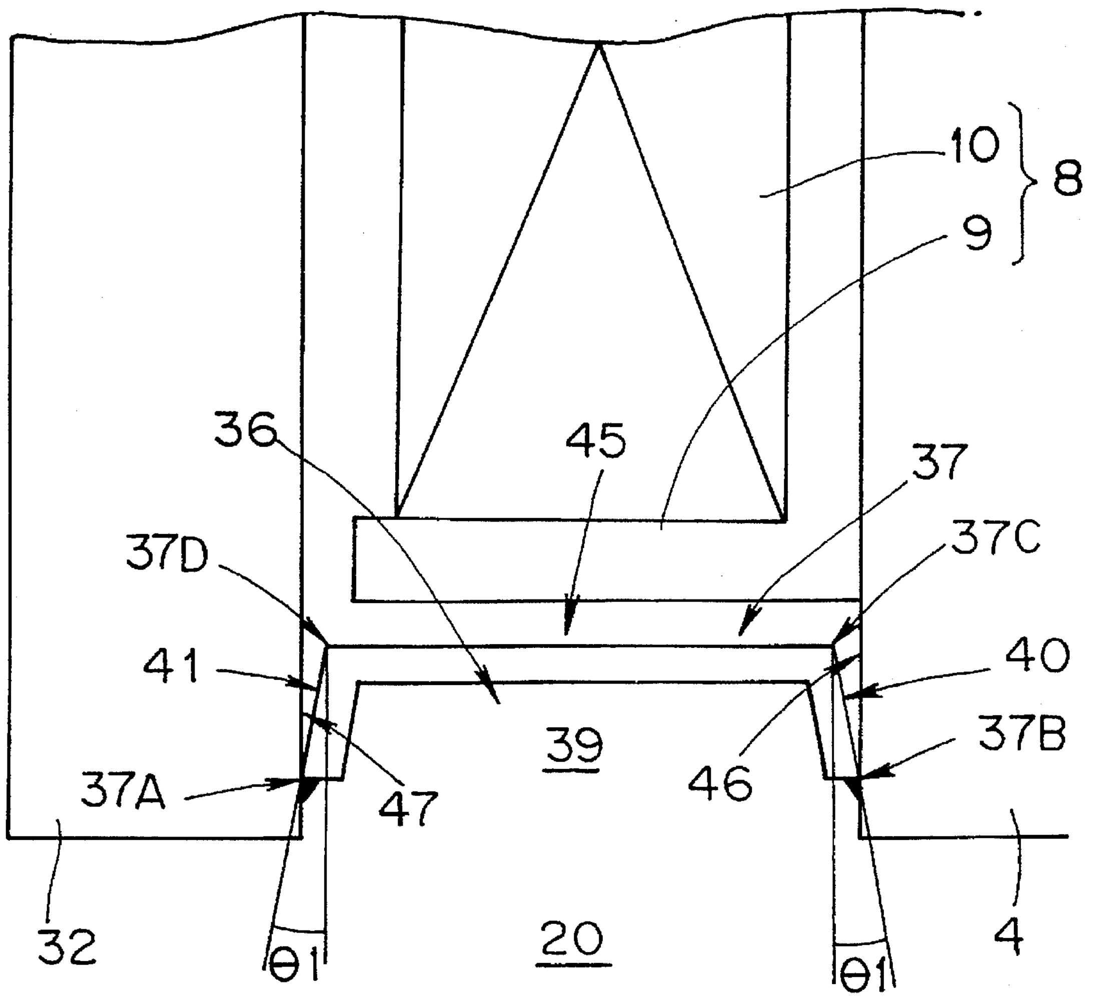
FIG. 4 is an enlarged view of an essential portion of a fuel invasion preventer which is a second embodiment of the present invention.

Such an arrangement is shown in FIG. 4, which is an enlarged sectional view of a fuel invasion preventer 45 in accordance with a second embodiment of the present invention. In the fuel invasion preventer 45, the outer wall 46 of the fuel supply pipe 4 and the inner wall 47 of the upper valve housing 32 to which the anti-invasion cover 37 is attached are not beveled (wall bevel angles θ2=0), where the structure is otherwise identical to that of fuel invasion preventer 31 shown in the first embodiment in FIGS. 1 to 3.

Since the outer wall 46 of the fuel supply pipe 4 and the inner wall 47 of the upper valve housing 32 are formed parallel to the longitudinal direction of the fuel supply pipe 4 and the upper valve housing 32, the cost of processing these wall portions can be reduced.

As was the case of the fuel invasion preventer 31 according to the first embodiment, invasion of fuel into the solenoid actuator 8 can be reliably prevented by laser-welding the lower inner edge 37B of the anti-invasion cover 37 to the outer wall 46 of the fuel supply pipe 4 and welding the lower outer edge 37A of the anti-invasion cover 37 to the inner wall 47 of the upper valve housing 32, thereby sealing off the solenoid actuator 8 from the continuous space 20.

Figure 5:
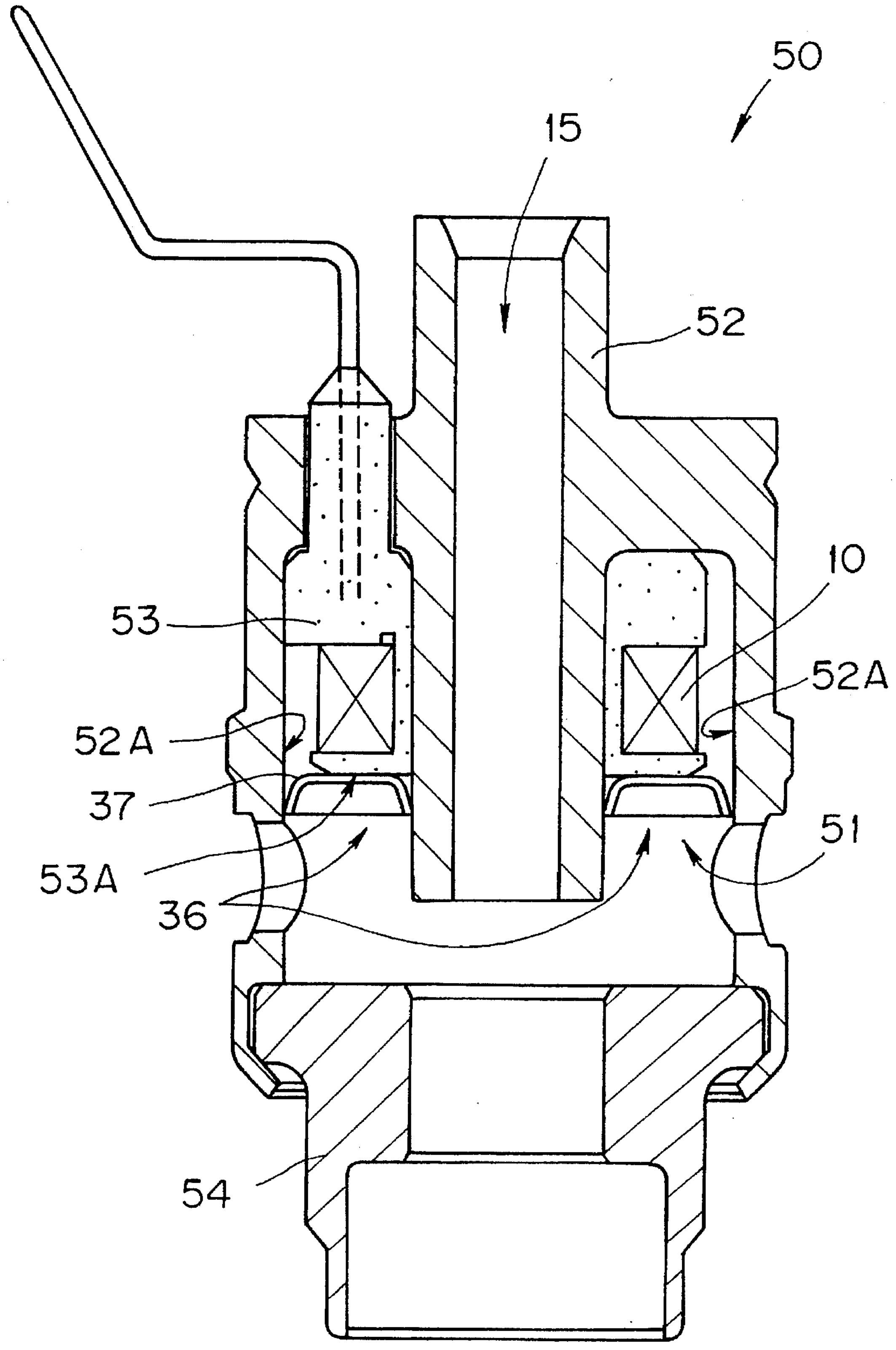
FIG. 5 is a schematic vertical view of a solenoid fuel injection valve equipped with a fuel invasion preventer which is a third embodiment of the present invention.

FIG. 5 is a schematic vertical view of a solenoid fuel injection valve 50 equipped with a fuel invasion preventer 51 according to a third embodiment of the invention.

The solenoid fuel injection valve 50 comprises a valve housing 52 which is obtained by integrally forming the valve housing 2 and fuel supply pipe 4 of the earlier embodiments, a bobbin 53 which is obtained by integrally forming the connector 3 and bobbin 9 of the earlier embodiments, and a valve seat 54 corresponding to the valve seat 6 of the earlier embodiments.

Other structural elements are omitted from the drawing.

Owing to this integration of components, the solenoid fuel injection valve 50 has a simpler structure than that of the solenoid fuel injection valve 30 of the first embodiment.

Moreover, like the second embodiment shown in FIG. 4, the inner wall 52A of the valve housing 52 to which the anti-invasion cover 37 is attached is not beveled (wall bevel angle θ=0), whereby a further cost reduction is realized.

In this third embodiment, since the inner wall 52A of the valve housing 52 is not beveled, the anti-invasion cover 37 is inserted into the anti-invasion space 36 in abutting relation with the bottom 53A of the bobbin 53.

Since, as explained in the foregoing, the fuel invasion preventer according to this invention is constructed by welding the anti-invasion cover in the anti-invasion space defined by the fuel supply pipe and the valve housing, invasion of fuel into the solenoid actuator can be reliably prevented. Moreover, the cost of fabricating the anti-invasion cover is reduced because the anti-invasion cover is shaped such that it has a spring effect, and therefore and therefore does not have to be fabricated with high dimensional precision.

What is claimed is:

1. A solenoid fuel injection valve, comprising:

a valve housing having an inner surface, a fuel supply pipe having an outer surface, the fuel supply pipe being made of a magnetic material and being disposed in the valve housing to form a fuel passage, a solenoid actuator which includes a bobbin having a passage through which the fuel supply pipe passes and a solenoid winding wound on the bobbin, the solenoid actuator being disposed inside the valve housing, an armature responsive to energization of the solenoid actuator, a valve seat having a fuel nozzle, a needle valve coupled to the armature and moveable between a first position wherein the needle valve closes the fuel nozzle and a second position wherein the needle valve opens the fuel nozzle in response to energization of the solenoid actuator, an anti-invasion cover made of a nonmagnetic material, the cover having an inner annular surface terminating in upper and lower inner edges and an outer annular surface terminating in upper and lower outer edges, wherein at least one of the inner and outer annular surfaces is beveled, the cover being disposed in an anti-invasion space defined by the bobbin of the solenoid actuator, the outer surface of the fuel supply pipe and the inner surface of the valve housing such that fuel is prevented from contacting the solenoid actuator.

2. The solenoid fuel injection valve according to claim 1, wherein the inner annular surface of the cover is beveled.

3. The solenoid fuel injection valve according to claim 1, wherein the outer annular surface of the cover is beveled.

4. The solenoid fuel injection valve according to claim 1, wherein at least one of the outer surface of the fuel supply pipe and the inner surface of the valve housing is oriented in parallel relation to an axis defined by the axial orientation of the anti-invasion cover.

5. The solenoid fuel injection valve according to claim 1, wherein the anti-invasion cover is inserted into the anti-invasion space toward the solenoid actuator from the side of a continuous space communicating with the fuel passage.

6. The solenoid fuel injection valve according to claim 1, wherein the anti-invasion cover is made of austenitic stainless steel.

7. The solenoid fuel injection valve according to claim 1, wherein the anti-invasion cover has a center insertion hole defining an annular space for passage of the fuel supply pipe.

8. The solenoid fuel injection valve according to claim 1, wherein the anti-invasion cover located in the anti-invasion space has its lower inner edge of the inner annular surface laser-welded to the outer surface of the fuel supply pipe and has its lower outer edge of the outer annular surface laser-welded to the inner surface of the valve housing.

9. The solenoid fuel injection valve according to claim 1, wherein the anti-invasion cover keeps the solenoid actuator from communicating with the fuel passage.

10. The solenoid fuel injection valve according to claim 1, wherein the valve housing is formed integrally with the fuel supply pipe.

11. The solenoid fuel injection valve according to claim 1, wherein the bobbin is formed integrally with a connector for supplying a control signal to the solenoid actuator.

12. The solenoid fuel injection valve according to claim 1, wherein the armature has a flat shape for high-pressure injection.

13. The solenoid fuel injection valve of claim 1, wherein the anti-invasion cover is welded to the fuel supply pipe and the valve housing.

14. The solenoid fuel injection valve of claim 13, wherein the lower inner edge of the anti-invasion cover is welded to the outer surface of the fuel supply pipe and the lower outer edge of the anti-invasion cover is welded to the inner surface of the valve housing.

15. A solenoid fuel injection valve, comprising:

a valve housing having an inner surface, a fuel supply pipe having an outer surface, the fuel supply pipe being made of a magnetic material and being disposed in the valve housing to form a fuel passage, a solenoid actuator which includes a bobbin having a passage through which the fuel supply pipe passes and a solenoid winding wound on the bobbin, the solenoid actuator being disposed within the valve housing, an armature responsive to energization of the solenoid actuator, a valve seat having a fuel nozzle, a needle valve coupled to the armature and moveable between a first position wherein the needle valve closes the fuel nozzle and a second position wherein the needle valve opens the fuel nozzle in response to energization of the solenoid actuator, an anti-invasion cover made of a nonmagnetic material, the cover having an inner annular surface terminating in upper and lower inner edges and an outer annular surface terminating in upper and lower outer edges, wherein at least one of the inner and outer annular surfaces is beveled, the cover being disposed in an anti-invasion space defined by the bobbin of the solenoid actuator, the outer surface of the fuel supply pipe and the inner surface of the valve housing, wherein at least one of the outer surface of the fuel supply pipe and the inner surface of the valve housing has a beveled portion defining the anti-invasion space and a non-beveled portion, the beveled portion and non-beveled portions defining a first angle therebetween, the at least one beveled surface of the anti-invasion cover defining a second angle with respect to the non-beveled portion of at least one of the outer surface of the fuel supply pipe and the inner surface of the valve housing such that fuel is prevented from contacting the solenoid actuator.

16. The solenoid fuel injection valve of claim 15, wherein the first angle is smaller than the second angle.

17. A solenoid fuel injection valve, comprising:

a valve housing, a fuel supply pipe made of a magnetic material and being disposed in the valve housing to form a fuel passage, a solenoid actuator which includes a bobbin having a passage through which the fuel supply pipe passes and a solenoid winding wound on the bobbin, the solenoid actuator being installed inside the valve housing, an armature responsive to energization of the solenoid actuator, a valve seat having a fuel nozzle, a needle valve coupled to the armature and moveable between a first position wherein the needle valve closes the fuel nozzle and a second position wherein the needle valve opens the fuel nozzle in response to energization of the solenoid actuator, an anti-invasion cover made of a nonmagnetic material, the cover having an inner annular surface terminating in upper and lower inner edges and an outer annular surface terminating in upper and lower outer edges, wherein at least one of the inner and outer annular surfaces is beveled, the cover being disposed between the solenoid actuator and the fuel passage such that the cover forms a seal and fuel is prevented from contacting the solenoid actuator.

18. The solenoid fuel injection valve of claim 17, wherein the valve housing has an inner surface, the fuel supply pipe has an outer surface and the cover is disposed in an anti-invasion space defined by the bobbin of the solenoid actuator, the outer surface of the fuel supply pipe and the inner surface of the valve housing.

19. The solenoid fuel injection valve of claim 18, wherein the anti-invasion cover is welded to the fuel supply pipe and the valve housing.

20. The solenoid fuel injection valve of claim 19, wherein the lower inner edge of the anti-invasion cover is welded to the outer surface of the fuel supply pipe and the lower outer edge of the anti-invasion cover is welded to the inner surface of the valve housing.

* * * * *